United States Patent [19]

Jung

[11] Patent Number: 4,619,070
[45] Date of Patent: Oct. 28, 1986

[54] FISHING PLANER LINE PROTECTOR

[76] Inventor: Fred C. Jung, 3411 East 52nd Avenue, Vancouver, British Columbia, Canada, V5S 1V6

[21] Appl. No.: 799,356

[22] Filed: Nov. 18, 1985

[51] Int. Cl.⁴ .............................................. A01K 95/00
[52] U.S. Cl. ................................. 43/43.13; 43/42.05; 43/42.22; 43/44.88
[58] Field of Search .................. 43/43.1, 43.13, 42.04, 43/42.05, 42.22, 44.88

[56] References Cited

U.S. PATENT DOCUMENTS

| | | | |
|---|---|---|---|
| 617,236 | 1/1899 | Dougherty | 43/44.88 |
| 2,234,943 | 3/1941 | Nyman | 43/43.13 |
| 3,872,616 | 3/1975 | Poland | 43/42.05 X |
| 4,411,090 | 10/1983 | Seals | 43/43.13 |
| 4,514,927 | 5/1985 | Fukemoto | 43/43.1 X |
| 4,567,687 | 2/1986 | Even et al. | 43/43.13 |

FOREIGN PATENT DOCUMENTS

| | | | |
|---|---|---|---|
| 597990 | 5/1960 | Canada | 43/43.13 |
| 2498890 | 8/1982 | France | 43/43.13 |

*Primary Examiner*—Nicholas P. Godici
*Assistant Examiner*—Carmine Cuda
*Attorney, Agent, or Firm*—Carver & Co.

[57] ABSTRACT

A fishing device has a body with a flat planing surface and a bail for slidably receiving a connector at an end of a fishing line. The bail has a first position for the connector where the planing surface is angled to carry the fishing line to a desired depth below the surface of a body of water and a second position, assumed by the connector when a fish strikes, where the planing surface is angled to move towards the surface of the water as the fishing line is reeled in. The device has a tubular line protector for slidably embracing the leader. The body has a recess for releasably connecting the line protector to the body. There is a fitting for engaging the line protector with the leader so the line protector is disconnected from the body when a fish pulls on the leader. The fitting disengages from the line protector to permit slidable movement of the line protector along the leader after the line protector is disconnected from the body.

15 Claims, 9 Drawing Figures

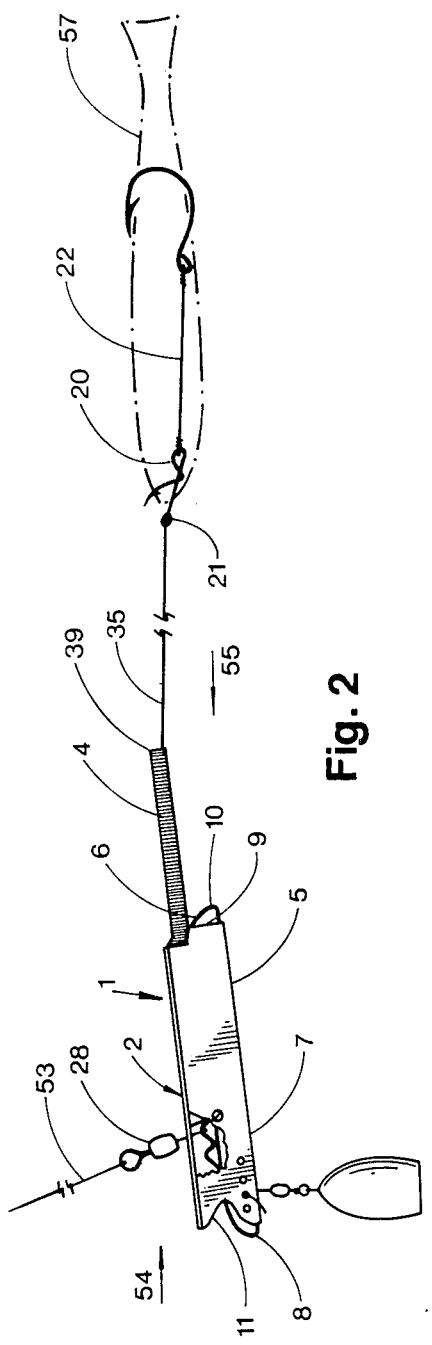
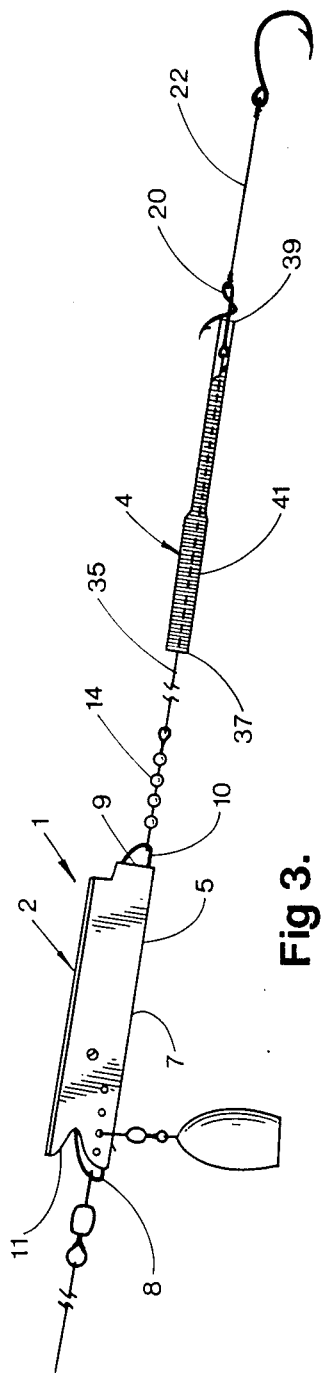
Fig. 2
Fig 3.

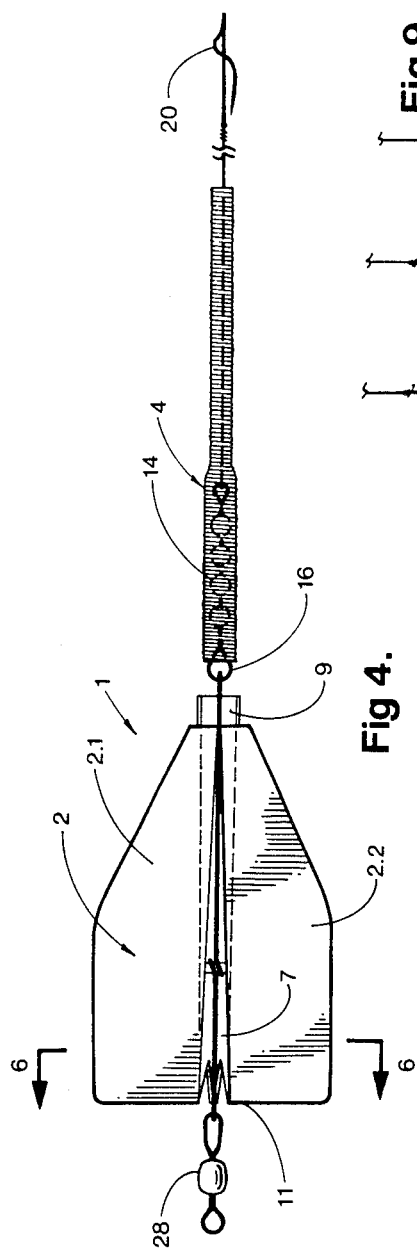
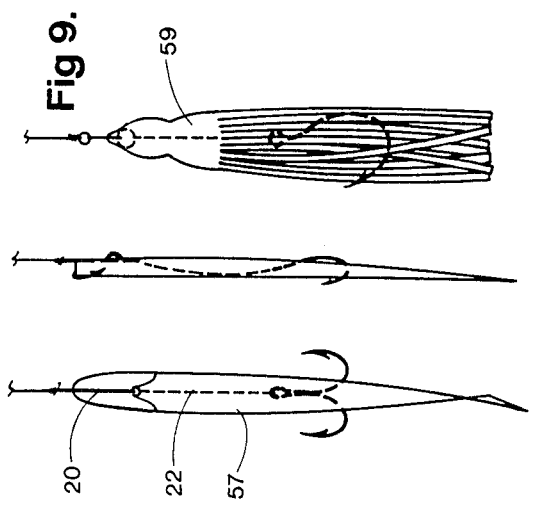
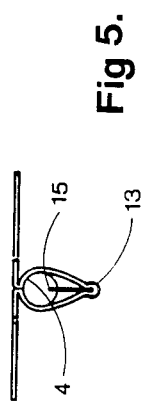
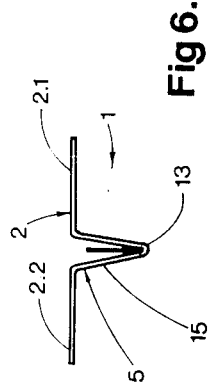

FISHING PLANER LINE PROTECTOR

BACKGROUND OF THE INVENTION

This invention relates to a planing device for carrying a fishing line to a desired depth below the surface of a body of water incorporating a tubular line protector which is released to slide along the leader to the position of the lure to protect the leader after a fish strikes.

Planing devices of the general type described herein are well known. These devices are intended to carry a lure or bait on the end of a fishing line to a desired depth below the surface of a body of water. These devices are usually used for trolling and are moved downwardly due to the force of water acting on a flat planing surface of the device when relative movement occurs between the device and the water. These devices typically include a wire bail. A swivel connector or some such means slidably connects the fishing line to the bail. The connector assumes one position on the bail during normal operation of the device. In this position the device is angled to carry the lure to the desired depth. When a fish strikes, and the fishing line is reeled in, the connector is moved along the bail to the front end of the device which causes the device to angle upwardly and more towards the surface with the lure and fish. One such device is disclosed, for example, in U.S. Pat. No. 3,466,787 to Collins. This patent relates to the use of a container on the bottom of the planar which contains a ballast.

U.S. Pat. No. 2,933,848 to Tollefson discloses a fish lure guide which includes one or more apertures for attaching a weight.

U.S. Pat. No. 3,742,639 to Butts shows a series of holes for attaching a fishing line to a fishing device. This patent also shows a number of apertures for attaching a weight.

U.S. Pat. No. 2,926,452 to Lewis shows a swivel guard to protect a swivel on a fishing line. The swivel guard is permanently located over the swivel in this case.

Other earlier patents providing general background for the invention include U.S. Pat. Nos. 2,825,994 to Bruhn, 4,282,672 to Neary, 2,716,832 to Minnie, RE.28,262 to Nye and 3,643,370 to Cook. The latter reference shows a bail member.

The above references do not disclose a planing device which holds a protector for the leader which is released from the planing device when a fish strikes and slides down the leader to afford protection in the vicinity of the lure. The prior art does not reveal a device of the general type having a weight which may be shifted in position to change the angle of the device and thus the depth assumed for a certain velocity relative to the water. The art also does not reveal devices of the general type having more than one selectable positions for connecting the fishing line during normal operation to adjust the angle the fishing line makes with the surface of the water.

SUMMARY OF THE INVENTION

According to the invention, a fishing device has a body with a flat planing surface and a bail for slidably receiving a connector at an end of a fishing line. The bail has a first position for the connector where the planing surface is angled to carry the fishing line to a desired depth below a body of water and a second position assumed by the connector when a fish strikes where the planing surface is angled to move towards the surface of the water as the fishing line is reeled in. The device has a tubular line protector for slidably embracing the leader. There is means for releasably connecting the line protector to the body. There is also means for engaging the line protector with the leader so the line protector is disconnected from the body when a fish pulls on the leader and for disengaging the line protector for slidable movement along the leader after the line protector is disconnected from the body.

BRIEF DESCRIPTION OF THE DRAWINGS

FIG. 2 is a side elevation of the device shown angled for normal operation to carry the device to a desired position below the surface of a body of water;

Fig. 3 is a side elevation showing the position assumed by the device after a fish strikes;

FIG. 4 is a top plan view thereof;

FIG. 5 is a rear elevation thereof;

FIG. 6 is a sectional view taken along line 6—6 of FIG. 4;

FIG. 7 is a plan view showing how the bait clip is connected to a bait fish;

FIG. 8 is a side view thereof connected to a herring strip; and

FIG. 9 is a plan view showing the bait clip connected to an artificial lure.

DESCRIPTION OF THE PREFERRED EMBODIMENTS

Figure 1:
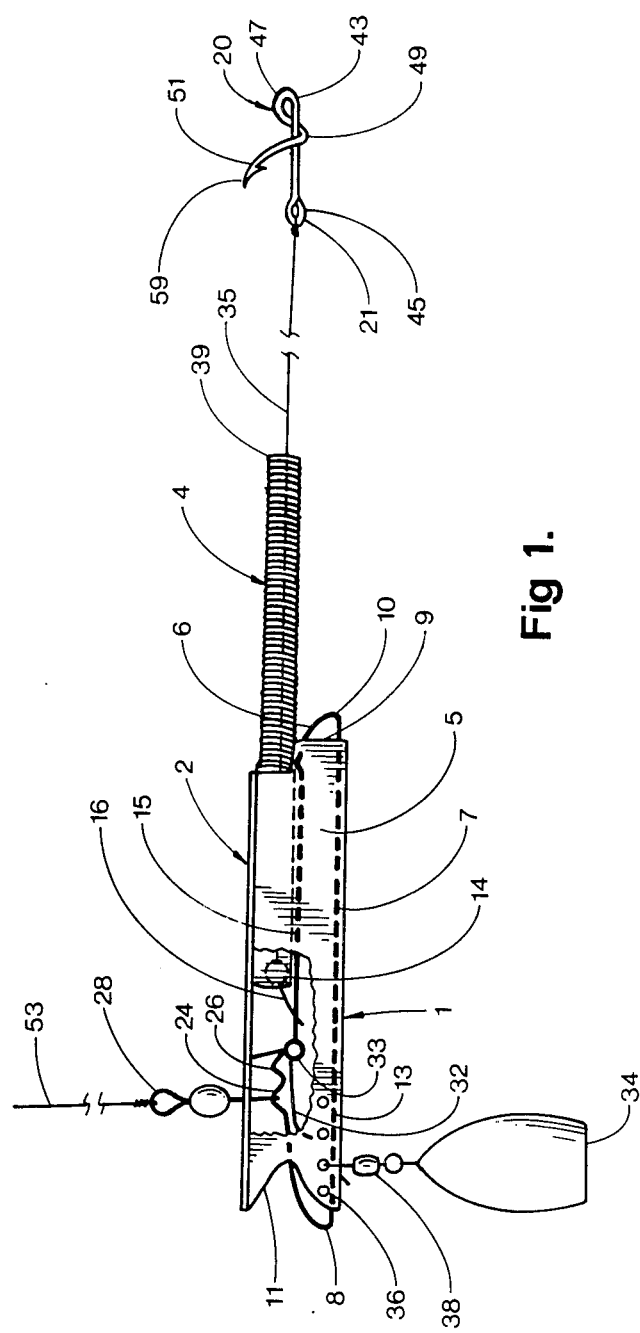
FIG. 1 is a side elevational view, partly broken away, of a fishing device according to an embodiment of the invention.

Referring to the drawings, these show a fishing device 1 of the type having a body 5 with a flat planing surface 2. The body in this embodiment is formed from plastic or, preferably stainless steel. The planing surface has two portions 2.1 and 2.2 in the form of wings extending laterally from a centre portion 7.

The centre portion 7 is somewhat teardrop-shaped adjacent rear end 9 of the body as may be observed in FIG. 5. The top of the centre portion is semicircular in section at this end as may be observed. At the opposite front end 11 the centre portion is V-shaped as may be observed in FIG. 6. The body carries a wire bail 6 which is generally parallel with the longitudinal centre line of the body. The bail has a bottom portion 13 extending along the bottom of the body which is crimped to secure the same as may be seen in FIGS. 5 and 6. The bail is looped to form a top portion 15 spaced apart from the bottom portion. The bail has a front end 8 and a rear end 10.

Two adjacent curved portions 24 and 26 are formed on the bail near the front end 8. A spring clip 32 forms part of the bail below curved portions 24 and 26. A coil 33 is formed on the bail so clip 32 is biased towards curved portions 24 and 26.

The device includes a weight 34 connected to the body 5 by a connector 38 secured to one of four apertures 36 near end 8 of the body. The weight is a conventional type such as a lead weight and can be exchanged for other weights.

A line protector 4 is releasably connected to the body 5. The line protector is tubular and freely embraces a leader 35 connected to the body by a swivel type connector 14 as shown in FIG. 3. The line protector in this embodiment is formed by a wire coiled in a tight helix.

The line protector has a first end 37 and a second end 39. A portion 41 of the line protector adjacent first end 37 is enlarged to fit freely over swivel connector 14. A wire loop 16 on the swivel connector is, however, too large to fit through the line protector. Loop 16 shown in FIGS. 1 and 4 slidably engages top portion 15 of the bail. In the normal position of the line protector, as shown in FIG. 2, its portion 41 frictionally engages the interior of centre portion 7 of the body. The line protector is urged against the inside of the top of the body by top portion 15 of the bail as may be appreciated from FIGS. 1 and 5.

Leader 35 connected to swivel connector 14 is usually several feet long although for illustrative purposes it is shortened in the drawings. The free end of the leader is tied to another fishing line connector in the form of bait clip 20 by a knot 21. Clip 20 is formed from a single piece of wire with a straight shank 43. An eye 45 is formed at one end of the shank. A loop 47 is formed at the opposite end of the shank and is connected to a hook 49 which extends about the shank and is connected to an extension 51 which curves towards the eye 45 and is spaced-apart therefrom. There is a barb 59 on extension 51 to keep bait from slipping over the bait clip. Loop 47 is used to connect the bait clip to a thin wire 22 leading to a hook 18.

A swivel connector 28 is used to connect the device to a fishing line 53 which extends to a conventional rod and reel. Swivel connector 28 is held in either of curved portions 24 or 26 of the bail by the spring clip 32.

OPERATION

The device 1 is typically used for fishing from a boat where there is relative velocity between the device and the water. This occurs during trolling or "mooching" in tidal currents. During normal operation, as shown in FIG. 2, the device moves in the direction indicated by arrow 55 relative to the water or, in other words, the water moves in the direction indication by arrow 54 relative to the device. The moving water contacts the top of the planing surface and causes the device to move downwardly. The angle of the device may be varied by moving weight 34 to different apertures 36. This determines the depth of the device for a certain velocity of water relative to the device. When more than one person is fishing at the same time, each person selects a different aperture 36 so that each will be fishing at a different depth and thus help avoid line entanglement. It should also be understood that the amount of weight 34 determines the depth of the device and the weight can be readily changed. This allows further adjustment.

Swivel connector 28 is positioned in either curved portion 24 or 26 of the bail. When moved to curved portion 24, the angle of fishing line 51 is reduced relative to the surface of the water. In other words, the device tends to move further from the boat when this positon is selected. This is desirable in rough conditions to minimise potential tangling of the line. Otherwise, as the boat lifts, it tends to move the device in one direction. When the boat dips, the device tends to turn around to move in the opposite direction and thus tangle the line. Reducing the angle minimises the motion of the device caused by the tossing boat.

Line protector 4 is employed to prevent the striking fish from damaging the leader. In the past steel wire has been used as the leader to prevent it from being sheared off by fish teeth. It is difficult to connect different types of bait to the steel wire and it cannot be used for live bait because it is difficult to link up the set of hooks to it. The steel wire is also too heavy to use for live bait because it will tire the live bait more rapidly. It is highly visible to fish under water and therefore discourages fish from striking at the bait. The use of line protector 4 permits a relatively light leader to be used without these problems. When the fish strikes, wire loop 16 of swivel connector 14 is pulled along top portion 15 of the bail and against end 37 of the line protector. This action pulls the line protector outwardly away from the body 5 where it is free to slide over the swivel connector and down the leader 35. Bait clip 20 stops the line protector and knot 21 fits into and engages the line protector to keep it from slipping back along the line. After the fish strikes, swivel connector 28 on fishing line 51 is pulled out of curved portion 24 or 26 of the bail and moves to end 8 as may be observed in FIG. 3. This causes the angle of the device to change as may be observed so the device moves towards the surface as the line is reeled in. This causes the leader to angle downwardly and thus the line protector slides down the leader to bait clip 20. The line protector fits snugly over knot 21 and accordingly does not move away readily even if at some point the leader becomes angled upwardly from swivel connector 14 to bait clip 20.

FIGS. 7 ad 8 illustrate how bait clip 20 and thin wire 22 are used to secure the device to a bait fish 57. The bait clip provides a unique and convenient device for this purpose. It may also be used for artificial lures 59 as shown in FIG. 9.

What is claimed is:

1. A fishing device comprising: a body with a flat planing surface; bail means for slidably receiving a connector at an end of a fishing line, the bail means having a first position for the connector where the planing surface is angled to carry the fishing line to a desired depth below a body of water and a second position assumed by the connector when a fish strikes where the planing surface is angled to move the device towards the surface of the water as the fishing line is reeled in; a tubular line protector for slidably embracing a leader; means for releasably connecting the line protector to the body; and means for engaging the line protector with the leader so the line protector is disconnected from the body when a fish pulls on the leader and for disengaging the line protector for slidable movement along the leader after the line protector is disconnected from the body.

2. A device as claimed in claim 1, wherein the line protector has a first end for releasable connection to the body and a second end extending towards a free end of the leader, the body having a recess shaped to frictionally engage the first end of the line protector.

3. A device as claimed in claim 2, wherein the means for engaging comprises a fitting positioned against the first end of the line protector when the line protector is connected to the body, the fitting being too large to pass through the line protector and having means to connect the fitting to the leader.

4. A device as claimed in claim 3, wherein the fitting slidably engages the bail means and has a first position on the bail means when the line protector is connected to the body and is movable to a second position on the bail means to disconnect the line protector when a fish pulls on a leader.

5. A device as claimed in claim 4, wherein the fitting includes a wire loop slidably engaging the bail means.

6. A device as claimed in claim 4, wherein the body has a longitudinal centre line, the bail means being parallel to the centre line and the line protector being parallel to the centre line when connected to the body.

7. A device as claimed in claim 2, further comprising a lure connecting means for connecting the leader to a fishing lure or bait, the line protector having an opening at the second end shaped to snugly embrace a portion of the lure connecting means.

8. A device as claimed in claim 1, further comprising a weight having means for connection to the body, the body having a plurality of means for receiving the weight at different positions to adjust the angle of the body.

9. A device as claimed in claim 1, wherein the bail means has a third position adjacent the first position, the device further comprising means for releasably holding the connection at the first position or the third position to adjust the angle between the fishing line and the surface of the water.

10. A device as claimed in claim 9, wherein the means for releasably holding includes curved portions of the bail means at the first position and the third position and a spring clip resiliently biased against the bail means at the first position and the third position.

11. A device as claimed in claim 2, wherein the second portion of the bail means is at a first end of the body and the recess is at a second end of the body which is opposite the first end.

12. A device as claimed in claim 1, wherein the bail means is a wire member.

13. A device as claimed in claim 1, wherein the line protector is formed by a helically wound wire.

14. A fishing device as claimed in claim 1 further comprising a swivel-type connector for connecting the leader to the body.

15. A fishing line device as claimed in claim 14, further comprising a second connector for connecting the leader at an end opposite the body, the connector comprising a wire-like member with a substantially straight shank, an eye formed at a first end of the shank, a loop formed at a second end of the shank opposite the eye, a hook extending about the shank and connected to the loop, and an extension connected to the hook curved towards the eye in spaced-apart relationship.

* * * * *